United States Patent
Tazartes et al.

(10) Patent No.: US 7,859,678 B2
(45) Date of Patent: Dec. 28, 2010

(54) AUTOMATIC GAIN CONTROL FOR FIBER OPTIC GYROSCOPE DETERMINISTIC CONTROL LOOPS

(75) Inventors: Daniel A. Tazartes, West Hills, CA (US); George A. Pavlath, Agoura Hills, CA (US)

(73) Assignee: Northrop Grumman Guidance and Electronic Co., Inc., Woodland Hills, CA (US)

( * ) Notice: Subject to any disclaimer, the term of this patent is extended or adjusted under 35 U.S.C. 154(b) by 233 days.

(21) Appl. No.: 12/316,060

(22) Filed: Dec. 9, 2008

(65) Prior Publication Data

US 2010/0141953 A1 Jun. 10, 2010

(51) Int. Cl.
*G01C 19/72* (2006.01)
(52) U.S. Cl. ...................................... 356/464
(58) Field of Classification Search ............... 356/459, 356/460, 464
See application file for complete search history.

(56) References Cited

U.S. PATENT DOCUMENTS

| | | | |
|---|---|---|---|
| 4,132,482 A | 1/1979 | Friedland | |
| 4,790,658 A | 12/1988 | Sewell | |
| 5,020,912 A * | 6/1991 | Pavlath | 356/464 |
| 5,208,653 A * | 5/1993 | Mark et al. | 356/467 |
| 5,949,545 A | 9/1999 | Lo | |
| 6,445,455 B1 * | 9/2002 | Hall et al. | 356/460 |
| 6,473,182 B1 * | 10/2002 | Tazartes et al. | 356/464 |
| 6,476,918 B1 | 11/2002 | Killpatrick | |
| 6,567,436 B1 | 5/2003 | Yao | |
| 7,633,626 B2 * | 12/2009 | Pavlath et al. | 356/464 |

* cited by examiner

*Primary Examiner*—Michael A Lyons
(74) *Attorney, Agent, or Firm*—Lynn & Lynn

(57) ABSTRACT

An automatic gain control system for a fiber optic gyroscope control loop includes an adjustable gain applied to the gyro output signal. A pilot signal is injected into the fiber optic gyroscope control loop. A compensation loop receives signals output from the control loop and also receives pilot signals. The compensation loop processes the pilot signal to produce a compensation signal that is combined with signals output from the control loop to provide a compensated fiber optic gyroscope output signal. An automatic gain control loop is connected between the compensation loop and the adjustable gain applied to the fiber optic gyroscope output signal. The automatic gain control loop includes a gain error demodulator that multiplies the compensated fiber optic gyroscope output signal and the compensation signal together to produce a gain error signal used to control the adjustable gain in order to stabilize the gain of the gyro control loop.

18 Claims, 3 Drawing Sheets

AUTOMATIC GAIN CONTROL FOR FIBER OPTIC GYROSCOPE DETERMINISTIC CONTROL LOOPS

BACKGROUND OF THE INVENTION

This invention relates generally to fiber optic gyroscope rotation sensing systems. More particularly, this invention relates to the processing of signals output from a fiber optic gyroscope to measure rotation rates. Still more particularly, this invention relates to an improved electronic dither system and method using a low amplitude dither signal in a fiber optic gyroscope signal processing system.

U.S. Pat. No. 5,020,912, which issued Jun. 4, 1991 to George A. Pavlath, one of the inventors of the present invention, discloses a deadband circumvention technique for a closed loop fiber gyro that uses deterministic phase modulation. A periodic zero mean dither signal is input to an integrator that also has the gyro demodulated rate signal as an input. A key requirement is that the gyro loop bandwidth be greater than the dither frequency, which in turn is larger than the sampling frequency. Ideally the dither frequency is at least ten times the sampling frequency, and the loop bandwidth is at least ten times the dither frequency. If these conditions are not met, problems occur in operation of the fiber optic gyro as a rotation sensor. The problems include saturation of the front end of the gyro control loop for large dither amplitudes due to the limited loop bandwidth and finite analog to digital converter input range and large dither residuals in the output if there are not precisely an integer number of dither cycles in the sampling period. Saturation in the control loop leads to increased random walk through failure to cancel the dither signal and other undesirable nonlinearities. Decreasing the amplitude of the dither signal to avoid saturation could result in there not being sufficient dither to break up the deadband at high sampling rates. Applying a small amplitude dither signal for a time longer than the sampling time causes each sample to include a large amount of residual dither. The disclosure of U.S. Pat. No. 5,020,912 is incorporated by reference into the present disclosure.

SUMMARY OF THE INVENTION

This invention permits the use of a perturbation to measure fiber optic gyroscope loop gain error so that it may be stabilized and eliminates the perturbation signal from the output of the fiber optic gyroscope.

The present invention produces a demodulated gain error by filtering the fiber optic gyroscope loop output signal and a pilot reference signal with a high pass filter that eliminates low frequency true angular rate signals. Filtering the pilot signal and the fiber optic gyroscope output signal with the same filter ensures proper phase relationship between these signals. The filtered signals are multiplied together and integrated to provide a gain error signal. The gain error signal may be further filtered or multiplied by a gain attenuation factor to provide the desired automatic gain control time constant. The automatic gain control signal is fed back to a variable gain to stabilize the gain.

An automatic gain control system according to the present invention for a fiber optic gyroscope system that includes a fiber optic gyroscope control loop arranged to process signals output from the fiber optic gyroscope comprises an adjustable gain applied to the signal output from the fiber optic gyroscope. A pilot signal generator is arranged to inject a pilot signal into the fiber optic gyroscope control loop that results in an output signal from the fiber optic gyroscope. The automatic gain control system further includes a compensation loop arranged to receive signals output from the fiber optic gyroscope control loop and to receive pilot signals from the pilot signal generator. The compensation loop is arranged to process the pilot signal to produce a compensation signal that is combined with signals output from the fiber optic gyroscope control loop to provide a compensated fiber optic gyroscope output signal. An automatic gain control loop is connected between the compensation loop and the adjustable gain applied to the fiber optic gyroscope output signal. The automatic gain control loop includes a gain error demodulator arranged to multiply the compensated fiber optic gyroscope output signal and the compensation signal together to produce a gain error signal used to control the adjustable gain in order to stabilize the gain of the fiber optic gyroscope control loop.

The fiber optic gyroscope control loop preferably comprises an analog to digital converter arranged to digitize the signal output of the fiber optic gyroscope, the adjustable gain being an adjustable digital gain, a control loop adder connected between the pilot signal generator and the adjustable digital gain, and an integrator connected to receive an output from the control loop adder that is the sum of the pilot signal and the digital gain.

The compensation loop comprises a compensation loop adder connected to the pilot signal generator, a compensation loop integrator connected to an output of the compensation loop adder, and a compensation loop gain connected to an output of the compensation loop integrator. The compensation loop gain has an output connected to an input of the compensation loop adder to provide negative feedback. The automatic gain control system preferably further comprises an adder arranged to add fiber optic gyroscope output signals from the control loop integrator to the compensation signal output from the compensation loop integrator to produce the compensated fiber optic gyroscope output signal.

The automatic gain control loop preferably comprises an automatic gain control error integrator connected to an output of the gain error demodulator, an automatic gain control loop amplifier arranged to amplify signals output from the automatic gain control error integrator, an automatic gain control loop filter connected between the automatic gain control loop amplifier and the adjustable digital gain, and a filter connected between the output of the compensation loop integrator and the gain error demodulator.

The automatic gain control system preferably further comprises a reference loop connected between the pilot signal generator and the gain error demodulator of the automatic gain control loop to provide a gain reference signal to the automatic gain control loop. The reference loop comprises a reference loop adder connected to the pilot signal generator a reference loop integrator connected to an output of the reference loop adder, and a reference gain connected to an output of the reference loop adder, the reference loop gain having an output connected to an input of the reference loop adder to provide negative feedback.

The control loop may alternatively comprise a variable gain analog amplifier arranged amplify analog signals output from the fiber optic gyroscope, an analog to digital converter connected to an output of the variable gain analog amplifier, a control loop adder having a first input connected to receive digital signals from the analog to digital converter and a second input arranged to receive signals from the pilot signal generator, and an integrator connected to receive an output from the control loop adder that is the sum of the pilot signal and the amplified loop error signal.

DETAILED DESCRIPTION OF THE INVENTION

Figure 1:
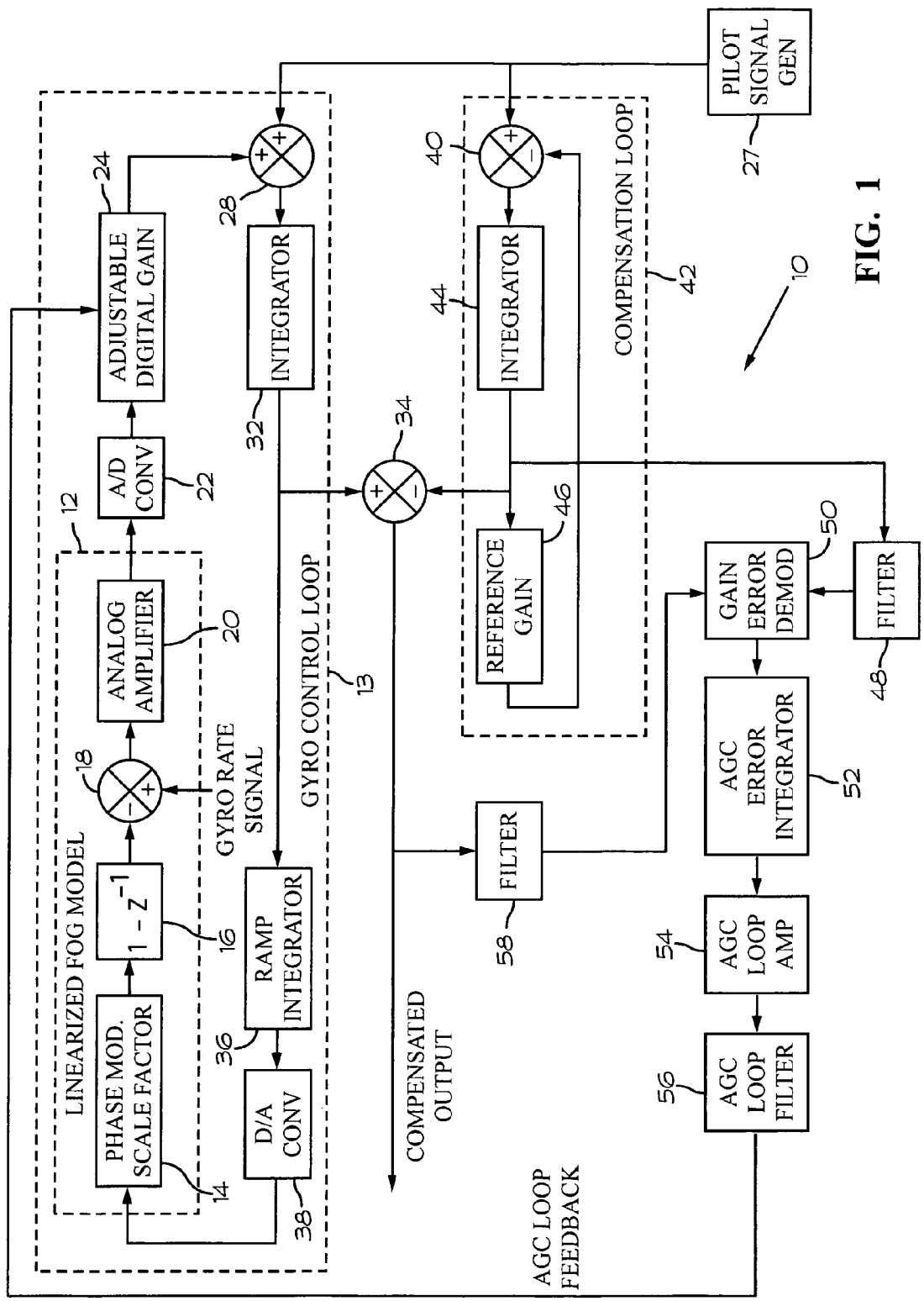
FIG. 1 is a block diagram of a digital automatic gain control system according to the present invention.

Referring to FIG. 1, an automatic gain control system 10 is shown connected to a linearized fiber optic gyroscope (FOG) model 12. The prior art includes descriptions of several fiber optic gyroscopes (not shown) that will function with the automatic gain control system 10. The linearized fiber optic gyroscope model 12 should be understood to represent any prior art fiber optic gyroscope.

The linearized fiber optic gyroscope model 12 includes a phase modulator 14 that has a selected scale factor. A control loop 13 forms the basis for a closed-loop fiber optic gyro. The output of the phase modulator 14 is input to the FOG 16, which is also connected to a summer 18. The summer 18 produces a signal output that is the difference of the signal input from FOG loop and the gyro rate signal. The output of the summer 18 is amplified by an analog amplifier 20 that has a selected gain. The amplified analog signal is then input to an analog to digital converter 22. The digital signal output from the analog to digital converter 22 is amplified by a digital gain block 24 that has an adjustable digital gain. The digital gain block 24 multiplies the output of the A/D converter 22 by the digital gain provided by the AGC loop filter 56. The amplified digital signal from the adjustable digital gain 24 is input to an adder 28.

A pilot signal generator 27 provides a pilot signal that may be a high frequency (e.g. 1940 Hz) square wave. The sum of the pilot signal 27 and the output of the digital amplifier 24 are summed in adder 28, and supplied as an input to an integrator 32. The output of the integrator 32 provides an integrated signal to a summer 34 and to a ramp integrator 36. The output of the ramp integrator 36 is input to a digital to analog converter 38 that has an output that is fed back into the phase modulator 14.

The pilot signal generator 27 also provides the pilot signal to a summer 40 that is included in a compensation loop 42. The summer 40 is connected to an integrator 44 that has output connected to the summer 34, a reference gain block 46, and to a high pass filter 48. The output of the reference gain block 46 is input to the summer 40, which is arranged to output the difference of the outputs from the reference gain block 46 and the pilot signal generator 27.

The filter 48 outputs a signal to a gain error demodulator 50 that is also connected to an automatic gain control error integrator 52. The integrated gain error signal from the automatic gain control error integrator 52 is input to an AGC amplifier 54 whose output is then input to an AGC loop filter 56.

The summer 34 provides a compensated output signal that is the difference between the output of the integrator 32 and the output of the integrator 44. The compensated output signal is input to a high pass filter 58 that is connected between the summer 34 and the gain error demodulator 50. The output of the AGC loop filter 56 is connected to the amplifier 24 to adjust the digital gain.

In order to produce a demodulated gain error signal, the compensated fiber optic gyroscope loop output signal and the pilot reference signal are preferably filtered with the high pass filters 48 and 58, respectively. High pass filtering eliminates DC (zero frequency) true angular rate signals that are present in the FOG loop (and hence the compensated FOG output signal). The filters 48 and 58 are preferably identical to ensure the proper phase relationship. The filtered signals are multiplied together by the gain error demodulator 50 and then integrated by the integrator 52 to provide a gain error signal. The gain error signal may be further filtered and/or multiplied by a gain or attenuation factor to provide the desired AGC loop time constant. The AGC control is fed back to the adjustable digital gain block 24 to stabilize the gain.

Figure 2:
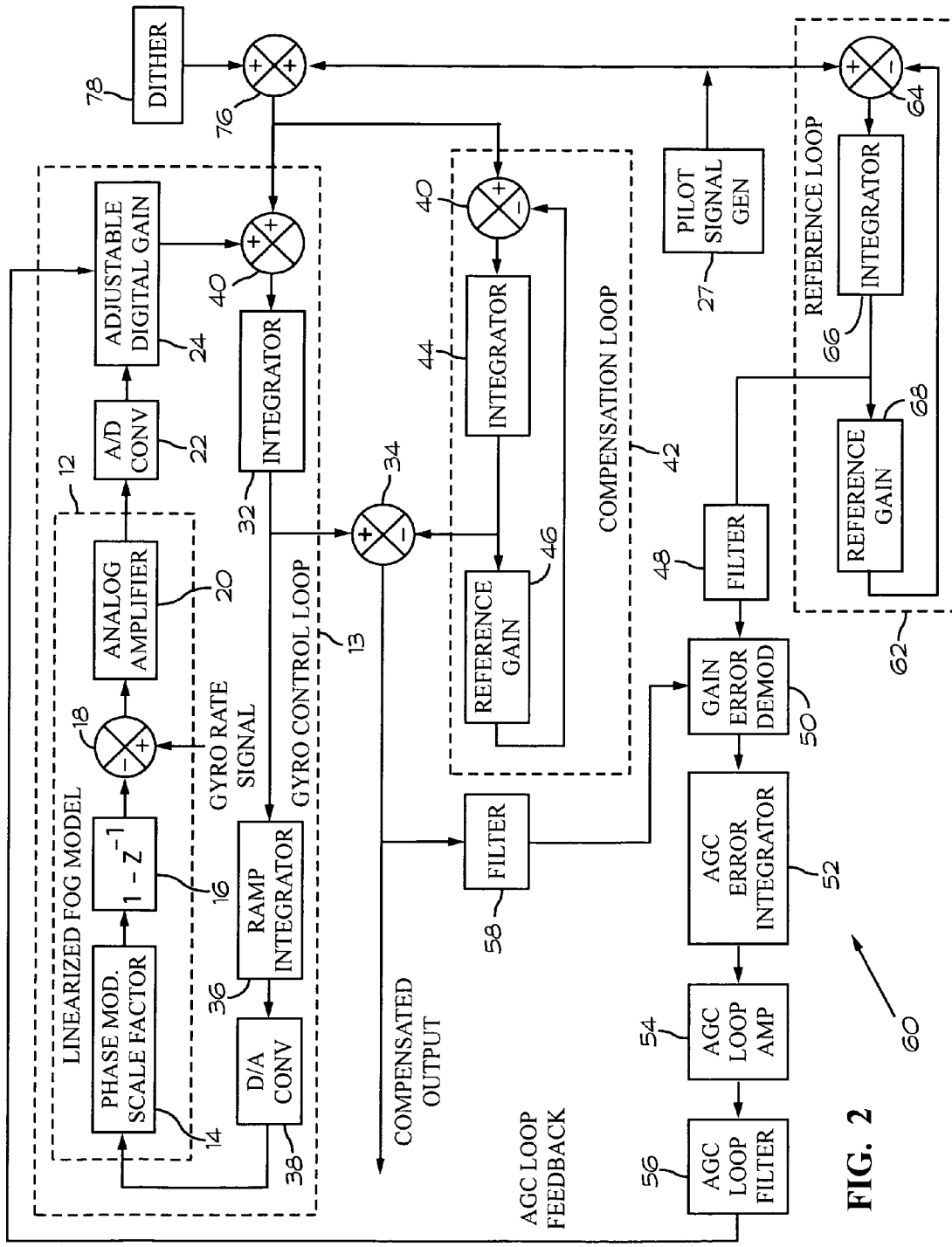
FIG. 2 is a block diagram of a digital automatic gain control system and automatic gain control system including deadband suppression according to the present invention.

FIG. 2 illustrates an automatic gain control system 60 that includes the structure of FIG. 1 plus the addition of deadband suppression. The pilot signal generator 27 is connected to a summer 64 that is included in a reference loop 62. The summer 64 is connected to an integrator 66. The integrator 66 output is connected to the filter 48 and to a reference gain block 68 that applies a reference gain to signals input thereto. The output of the reference gain block 68 is fed back into the summer 64. The output of summer 64 is the difference between the pilot signal 27 and the output of the reference gain block 68.

The pilot signal generator 27 output is also connected to a summer 76. The summer 76 also receives a dither signal from a low frequency dither signal generator 78. The dither signal preferably has a frequency of about 10 Hz. The combined pilot signal and dither signal are input to the summer 28, which adds the dithered pilot signal to the output of the adjustable digital gain block 24. The compensation loop 42 now takes its input from the output of summer 76 which represents the sum of the dither and pilot signals. The reference loop 62 is used to drive the gain control loop that is comprised of the filter 48, gain error demodulator 50, AGC loop integrator 52, AGC loop amplifier 54, and AGC loop filter 56 which act together as in FIG. 1 to control the adjustable digital gain block 24 so as to stabilize the overall gain of the gyro loop.

Figure 3:
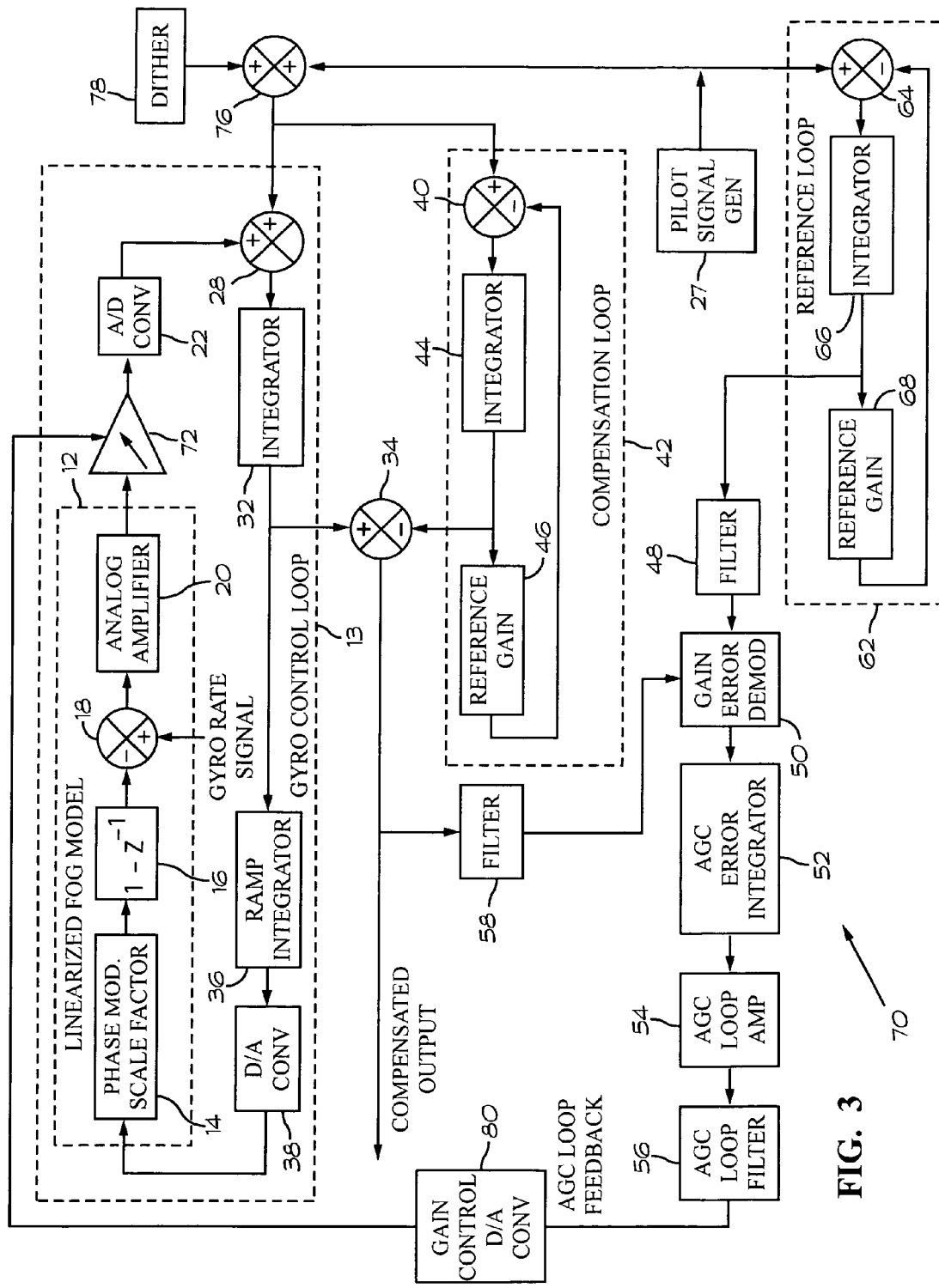
FIG. 3 is a block diagram of an analog automatic gain control system including deadband suppression according to the present invention.

FIG. 3 is a block diagram showing an automatic gain control system 70 that includes deadband suppression and analog automatic gain control instead of the digital analog automatic gain control of FIGS. 1 and 2. In FIG. 3, a variable gain analog amplifier 72 is included between the analog amplifier 20 and the analog to digital converter 22. The AGC system 70 does not include the adjustable digital gain amplifier 24 of FIGS. 1 and 2. In the AGC system 70 a gain control digital to analog converter 80 is placed between the AGC loop filter 56 and the variable gain analog amplifier 72.

The present invention stabilizes the loop gain and frequency response of the FOG loop 12 to ensure proper performance of the FOG 16 in vibration and shock environments, regardless of variations in the basic contributors to FOG open loop gain. This can be accomplished in concert with deadband suppression.

This invention applies a perturbation (pilot signal or pilot and dither) to both the FOG loop 13 and to the compensation loop 42, which has the same overall form as the FOG loop 13. The gain of the compensation loop 42 is chosen to be a fixed reference value. The compensation loop output is used to compensate the FOG output to form a compensated FOG output. If the gain of the FOG loop does not match the fixed target value set in the compensation loop 42, then an error signal will be present in the compensated FOG output. This error signal will be synchronous with the perturbation signal and can be detected by demodulation. This detected error signal forms the basis for an outer loop that adjusts the gain of the FOG loop 13. FOG loop gain adjustment may be accomplished via a variable gain amplifier in the FOG loop or with a digital gain, whose gain is driven by the outer loop, which then becomes the AGC loop. Once the AGC loop has converged, the FOG loop 13 will be stabilized to the target gain value established by the reference gain, and the compensation signal will cancel the effect of the perturbation driven into the FOG loop 13. Furthermore, as the FOG parameters (i.e. FOG intensity, photodetector sensitivity, etc.) change the variable gain acts to counter any such variations so that the overall gain of the FOG loop 13 remains constant. This ensures constant frequency response of the FOG 16.

This invention permits the use of a perturbation to permit measurement of FOG loop gain error, and consequently stabilize the loop gain and eliminating the effect of the perturbation signal from the output of the FOG loop 13. This invention also permits the injection of a dither signal as part of the perturbation to enable simultaneous deadband suppression without inducing additional noise in the compensated output of the FOG.

What is claimed is:

1. An automatic gain control for a fiber optic gyroscope system that includes a fiber optic gyroscope control loop arranged to process signals output from the fiber optic gyroscope, comprising:
   an adjustable gain applied to the signal output from the fiber optic gyroscope;
   a pilot signal generator arranged to inject a pilot signal into the fiber optic gyroscope control loop which results in an output signal from the fiber optic gyroscope;
   a compensation loop arranged to receive signals output from the fiber optic gyroscope control loop and to receive pilot signals from the pilot signal generator, the compensation loop being arranged to process the pilot signal to produce a compensation signal that is combined with signals output from the fiber optic gyroscope control loop to provide a compensated fiber optic gyroscope output signal; and
   an automatic gain control loop connected between the compensation loop and the adjustable gain applied to the fiber optic gyroscope output signal, the automatic gain control loop including a gain error demodulator arranged to multiply the compensated fiber optic gyroscope output signal and the compensation signal together to produce a gain error signal used to control the adjustable gain in order to stabilize the gain of the fiber optic gyroscope control loop.

2. The automatic gain control of claim 1, wherein the fiber optic gyroscope control loop comprises:
   an analog to digital converter arranged to digitize the signal output of the fiber optic gyroscope, the adjustable gain being an adjustable digital gain;
   a control loop adder connected between the pilot signal generator and the adjustable digital gain; and
   a control loop integrator connected to receive an output from the control loop adder that is the sum of the pilot signal and the digital gain.

3. The automatic gain control of claim 2 wherein the compensation loop comprises:
   a compensation loop adder connected to the pilot signal generator;
   a compensation loop integrator connected to an output of the compensation loop adder; and
   a compensation loop gain connected to an output of the compensation loop integrator, the compensation loop gain having an output connected to an input of the compensation loop adder to provide negative feedback.

4. The automatic gain control of claim 3, further comprising an adder arranged to add fiber optic gyroscope output signals from the control loop integrator to the compensation signal output from the compensation loop integrator to produce the compensated fiber optic gyroscope output signal.

5. The automatic gain control of claim 2 wherein the automatic gain control loop comprises:
   an automatic gain control error integrator connected to an output of the gain error demodulator;
   an automatic gain control loop amplifier arranged to amplify signals output from the automatic gain control error integrator; and
   an automatic gain control loop filter connected between the automatic gain control loop amplifier and the adjustable digital gain.

6. The automatic gain control of claim 5, further comprising a first filter connected between the output of the compensation loop integrator and a first input of the gain error demodulator.

7. The automatic gain control of claim 5, further comprising:
   a reference loop having an input connected to the pilot signal generator; and
   a second filter connected between an output of the reference loop and a second input of the gain error demodulator to provide a reference signal to the automatic gain control loop.

8. The automatic gain control of claim 7 wherein the reference loop comprises:
   a reference loop adder connected to the pilot signal generator;
   a reference loop integrator connected to an output of the reference loop adder; and
   a reference gain connected to an output of the reference loop adder, the reference loop gain having an output connected to an input of the reference loop adder to provide negative feedback.

9. The automatic gain control of claim 1, further comprising a reference loop connected between the pilot signal generator and the automatic gain control loop to provide a gain reference signal to the automatic gain control loop.

10. The automatic gain control of claim 9, further comprising:
    an adder having a first input connected to the pilot signal; and
    a dither signal generator connected to a second input of the adder, the adder having an output connected to an input of the control loop adder to inject the pilot signal and the dither signal into the fiber optic gyroscope control loop.

11. The automatic gain control of claim 1 wherein the control loop comprises:
    a variable gain analog amplifier arranged amplify analog signals output from the fiber optic gyroscope;
    an analog to digital converter connected to an output of the variable gain analog amplifier
    a control loop adder having a first input connected to receive digital signals from the analog to digital converter and a second input arranged to receive signals from the pilot signal generator; and
    an integrator connected to receive an output from the control loop adder that is the sum of the pilot signal and the digital gain.

12. The automatic gain control of 11, further comprising a gain control digital to analog converter in the gain control loop connected to the variable gain analog amplifier.

13. The automatic gain control of claim 12 wherein the compensation loop comprises:
- a compensation loop adder connected to the pilot signal generator;
- a compensation loop integrator connected to an output of the compensation loop adder; and
- a compensation loop gain connected to an output of the compensation loop integrator, the compensation loop gain having an output connected to an input of the compensation loop adder to provide negative feedback.

14. The automatic gain control of claim 13, further comprising an adder arranged to add fiber optic gyroscope output signals from the control loop integrator to the compensation signal output from the compensation loop integrator to produce the compensated fiber optic gyroscope output signal.

15. The automatic gain control of claim 12 wherein the automatic gain control loop comprises:
- an automatic gain control error integrator connected to an output of the gain error demodulator;
- an automatic gain control loop amplifier arranged to amplify signals output from the automatic gain control error integrator; and
- an automatic gain control loop filter connected between the automatic gain control loop amplifier and the adjustable digital gain.

16. The automatic gain control of claim 15, further comprising a first filter connected between the output of the compensation loop integrator and the gain error demodulator.

17. The automatic gain control of claim 15, further comprising:
- a reference loop having an input connected to the pilot signal generator; and
- a second filter connected between an output of the reference loop and a second input of the gain error demodulator to provide a reference signal to the automatic gain control loop.

18. The automatic gain control of claim 17 wherein the reference loop comprises:
- a reference loop adder connected to the pilot signal generator;
- an reference loop integrator connected to an output of the reference loop adder; and
- a reference gain connected to an output of the reference loop adder, the reference loop gain having an output connected to an input of the reference loop adder to provide negative feedback.

* * * * *